United States Patent [19]
Johnson et al.

[11] Patent Number: 5,100,445
[45] Date of Patent: Mar. 31, 1992

[54] AIR REGISTER FILTER/COVER

[76] Inventors: Howard C. Johnson, Clear Lake; Marlys Kueng, Roseville, both of Minn.

[21] Appl. No.: 770,899

[22] Filed: Oct. 4, 1991

[51] Int. Cl.$^5$ .............................................. B01D 46/10
[52] U.S. Cl. ...................................... 55/413; 55/419; 55/493; 55/495; 55/504; 55/518; 55/519; 55/DIG. 31
[58] Field of Search ................. 55/359, 419, 495, 504, 55/510, 515, 518, 519, DIG. 31, 413–417, 497, 493

[56] References Cited
U.S. PATENT DOCUMENTS

| | | | |
|---|---|---|---|
| 3,046,719 | 7/1962 | Tropiano | 55/DIG. 31 X |
| 3,429,434 | 2/1969 | Hickin | 55/DIG. 31 X |
| 3,823,926 | 7/1974 | Bracich | 55/504 X |
| 3,831,765 | 8/1974 | Flynn et al. | 55/519 X |
| 3,905,787 | 9/1975 | Roth | 55/518 X |

Primary Examiner—Charles Hart
Attorney, Agent, or Firm—Douglas L. Tschida

[57] ABSTRACT

A disposable filter for heating and ventilating registers wherein a supporting framework includes apertures with removable cover portions which permit selective air flow, means for securing the framework to the register or adjacent structural members and re-closable means for admitting a filter element to an interior cavity. In alternative configurations, differing filter media or replacement media may be mounted to the framework. A separately attached border trim may also be included for oversize registers. Also considered is a finish cover including means for retaining the filter to the cover and the cover to the ductwork port.

11 Claims, 8 Drawing Sheets

AIR REGISTER FILTER/COVER

BACKGROUND OF THE INVENTION

The present invention relates to filtering means for recirculating air systems and, in particular, to a cartridge filter/cover which is mountable within supply and return registers.

Commercial and residential heating and cooling systems have long utilized a filter element in close proximity to a blower or fan means which induces airflow through the ducted system. Such filters are commonly mounted within prepared slideways formed in the ductwork or plenums adjacent the air source. The filter media may also comprise a sheet stock material which is mounted within a bordering retainer. Alternatively, the sheet filter meedia may be supported from a wire frame assembly or other framework within a plenum portion of the system.

Known filter mountings however do not filter the plurality of inlets and outlets of the duct system, nor provide means for the filter to separately attach to the air handling system, nor permit selective closure of the plurality of inlets and outlets.

During the construction process of most residential and commercial buildings, air handling ductwork is installed before the wall and flooring materials are added. Consequently, once the ductwork is roughed-in with all inlet and outlet ports commonly left exposed and may collect debris. On occasion, builders may insert pieces of fiberglass batting to fill one or more outlets and prevent the collection of construction debris. Such batting is not intended to permit operation of the system, but merely plug the passage to debris.

Over the life and operation of the system, any debris within the ductwork can be repeatedly re-circulated. During the initial period of system operation, dust recirculation can be especially troublesome. Most troublesome is dust which accumulates from the preparation of sheetrock walls. This dust is extremely fine and can be repeatedly circulated over many weeks, once the ventilating system is initiated.

Depending upon the climate, it may also be necessary on occasion to operate the heating or cooling system during the construction process. Plugged ducts must then be exposed and debris may collect in the system. Although debris might later be vacuumed with the final preparation of the home, the operation of the system tends to distribute the dust throughout the system, with subsequent redistribution through the building.

Applicant accordingly has sought to develop a filter cartridge which readily accommodates use during building construction either as a plug or a filter. The assembly has also been designed to permit use by the homeowner within all or selected rooms of the heating system to further filter either the supply or return air conducted through the selected rooms.

SUMMARY OF THE INVENTION

It is accordingly a primary object of the present invention to provide a filter/cover assembly which is readily adapted to supply and return air ports of a ductwork system.

It is a further object of the invention to provide an assembly which accommodates a variety of types of filter media and which may be mounted to the ductwork independent of a finish cover, such as during building construction.

It is a further object of the invention to provide a cartridge type of filter assembly including a die-cut, cardboard framework for supporting a filter media and means for restraining the cartridge to the ports of the ductwork system.

It is a further object of the invention to provide a framework which includes a plurality of removable or partially removably aperture covers.

It is a further object of the invention to provide a cartridge framework which permits replacement of the filter media.

It is a further object of the invention to provide a cartridge framework including a border trim or border appendages which circumscribe the framework to restrain the cartridge to duct openings, regardless of size.

It is a still further object of the invention to provide an ornamental trim plate or finish cover including means for restraining the filter cartridge to the trimpiece and the trimpiece to the duct opening.

Various of the foregoing objects, advantages and distinctions of the invention are particularly achieved in various alternative constructions which are described hereinafter. In one wall mount construction, a die-cut cardboard framework is provided which includes a plurality of die-cut apertures in one surface and a plurality of partially slit, knockout covers in an opposite surface. End flaps permit insertion of a filter media within a cavity space between the surfaces to filter airborne particulates. Depending upon the mounting location of the cartridge and the debris to which it most typically is to be exposed, the filter media may also be changed.

The knockout covers permit selective control of air through the filter. That is, the knockouts may be left in place or selectively removed if airflow is desired through the covered ductwork port. That is, where the cartridge is merely being used as a plug, the knockouts are not removed. However, if it is necessary to operate the ventilation system, the knockouts can be removed to permit air passage and filtering. Ones of the knockout covers or the sides of the framework include hinged tab portions which may be bent to project from the cartridge to permit fastening to the ductwork, such as by tape, staples, adhesive or the like.

In a floor or ceiling duct construction of the invention, the cartridge includes hinged end tabs which projects from the periphery of the framework. The tabs support the cartridge within a duct opening. Again, knockouts are provided for selective use as a plug or filter. A separate border trim may also be secured to the tabs to permit use of small filters with oversize outlets.

An ornamental trimpiece is also disclosed which includes a plurality of clips for restraining the filter to the trimpiece and the trimpiece to the ductwork.

Still other objects, advantages and distinctions of the invention, along with a detailed discussion of the various constructions are provided hereinafter with respect to the appended drawings. The description is intended to be illustrative only of the presently considered constructions of the invention, improvements and modifications thereto. The description should not be interpreted in limitation of the invention, which rather should be interpreted within the scope of the following appended claims.

DESCRIPTION OF THE PREFERRED EMBODIMENT

Figure 1:
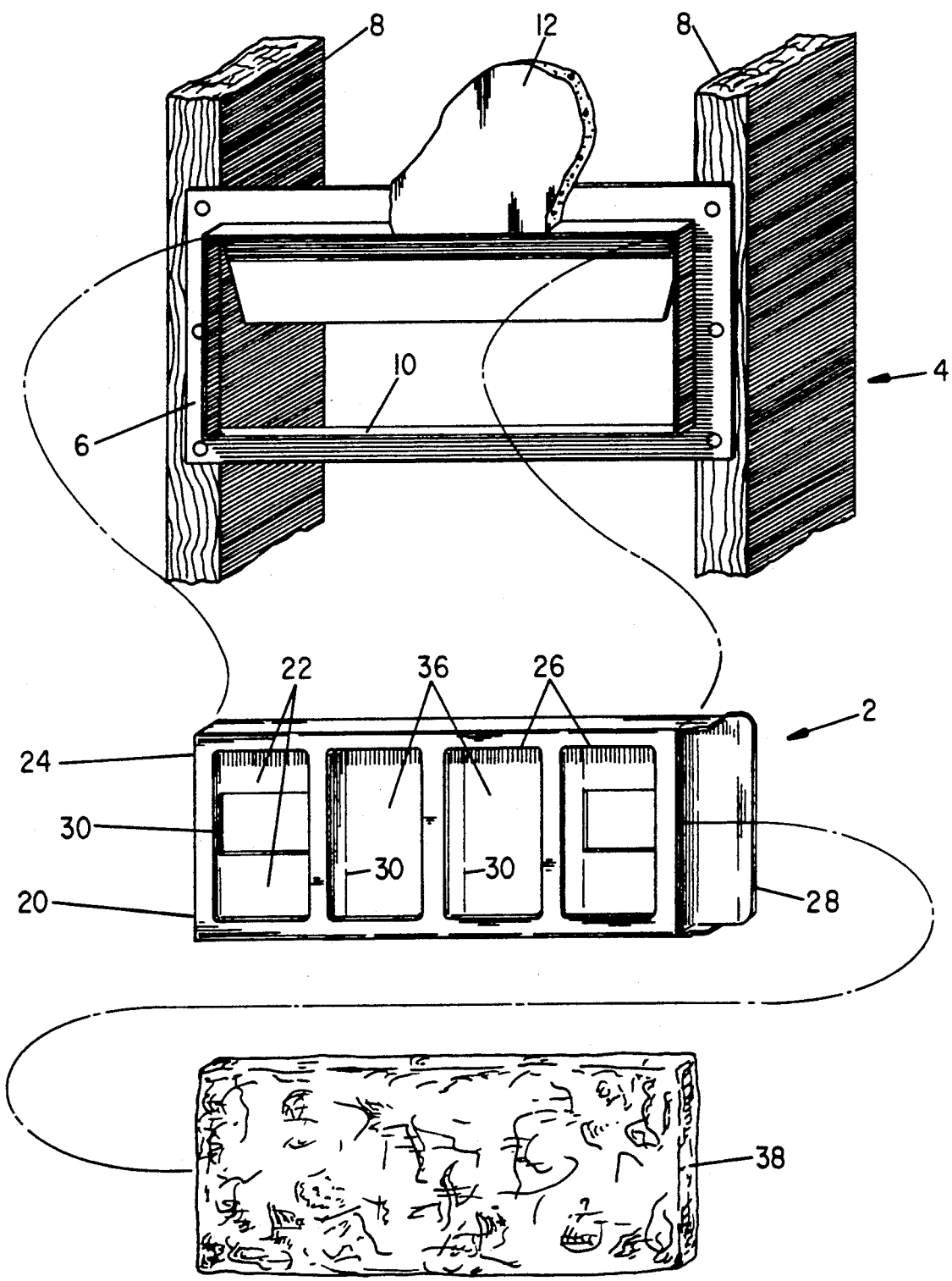
FIG. 1 is a perspective drawing in exploded assembly of a wall mount filter cartridge in relation to a typical duct opening.

Referring to FIG. 1, a perspective drawing is shown in exploded assembly of a filter assembly 2 of the invention in relation to a typical wall supply or return port 4 of an air handling system. Depending upon the requirements of the heating and ventilating systems, such ports are commonly provided in the wall, ceiling or floor of residential and commercial buildings. The ports may lead directly to rigid or flexible ductwork that is coupled to the heating or cooling source. A related blower or fan at the source induces air movement in an appropriate direction through the ductwork. Return ducting may be formed in the airspace between the framing members which are appropriately coupled to other runs of ducting within the system.

FIG. 1 particularly depicts a typical wall return inlet or supply outlet port 4 which is formed via a sheet metal collar 6 which separately attaches between adjacent framing members 8, such as metal or wooden studs. The collar 6 is affixed via screws, nails or staples and is typically formed of sheetmetal. A rim 10 projects from the collar in relation to the wall board 12 to define an appropriately configured hole or port of a predetermined dimension relative to the airflow demands of the room. Upon finishing the room a trim cover or finish register plate is separately attached to the framing members. A baffled gridwork or louvers formed in the trimpiece typically obscure the opening, but otherwise the port 4 is exposed to normal air circulation. An improved plate will be discussed with reference to FIG. 8.

In some circumstances, a plastic shroud might also be mounted to the port 4 to redirect airflow. The port 4 itself, otherwise, is left open. Free airflow is thereby obtained without restriction or filtration at the supply or return ports.

Any filtering of the interior air commonly takes place at the heating or air conditioning source and whereto a replaceable air filter element is typically confined within a channel formed in or in close association to the return air plenum. Alternatively a wireform support may be mounted within the plenum to support a web of filter media in relation to the fan blower. As air is drawn into the blower, airborne particulates are removed at the filter.

Depending upon the interior environment, such single level filtration may be less than adequate. This is especially true where the system is operated during construction or closely following construction. At such times, sawdust and fine sanding particulates are produced with the finishing of the walls etc. which can collect within the duct system and be repeatedly recirculated over time.

Figure 2:
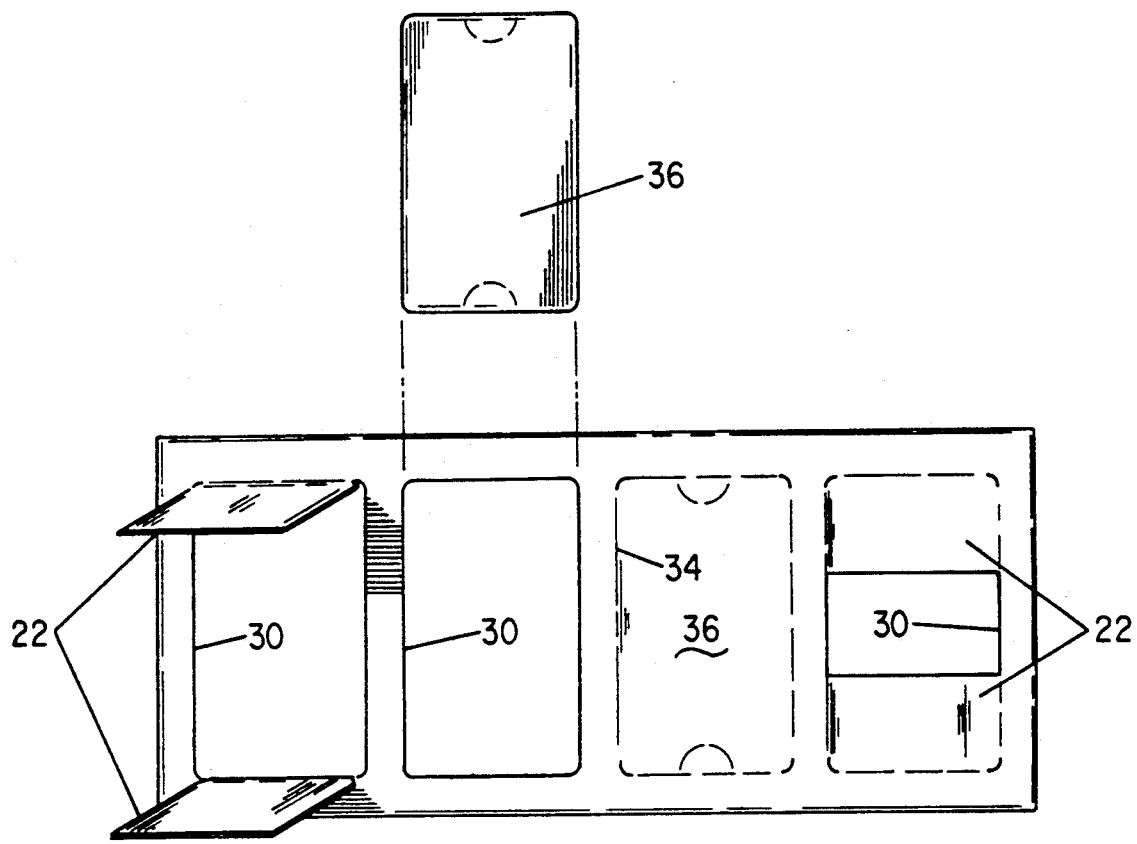
FIG. 2 is a front elevation drawing of the cartridge of FIG. 1, with one of the knockouts removed.

Returning attention to FIG. 1, therefore, a cartridge filter assembly 2 is provided which is sized to mount within a variety of supply and return ports. Such an assembly 2 can be used during initial construction or throughout the life of the building. Presently, a disposable cartridge filter 20 is contemplated which provides means for use either as a filter or a plug. The cartridge 20 is sized to mount within the duct opening 4 and is retained thereto with associated restraint tabs 22 that are hinged to the framework 24 (see also FIG. 2).

Although a disposable cartridge 20 is contemplated, it is to be appreciated the cartridge framework 24 can be constructed of more permanent materials and in a form to replace the heretofore separately attached register covers. One such assembly will be discussed at FIG. 8.

Figure 3:
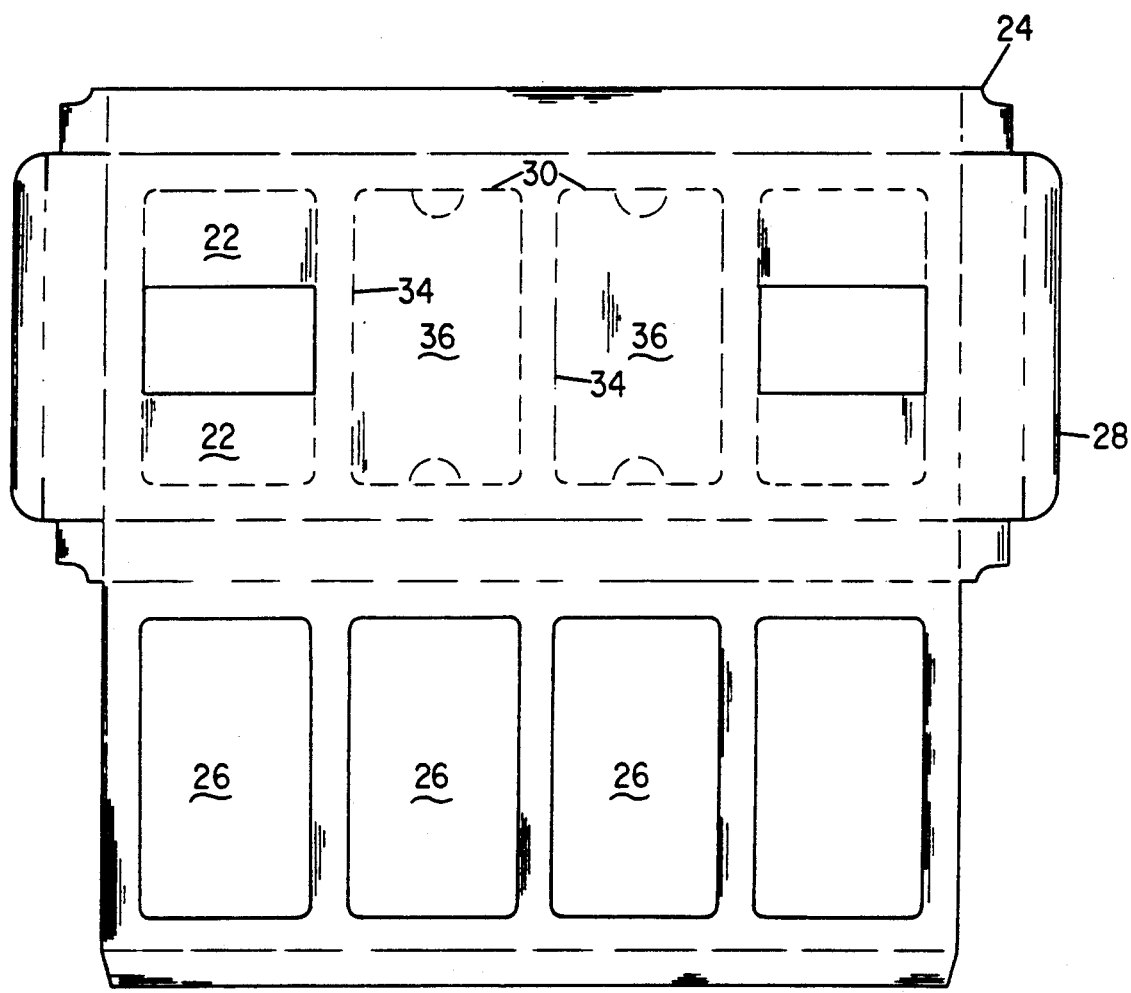
FIG. 3 is a drawing of the cartridge frame before assembly.

Otherwise and with attention to FIG. 3, the preformed framework 24 is constructed from a die-cut cardboard flat stock. The stock is appropriately cut, slit and perforated to provide a framework 24 which when glued and expanded to shape includes a plurality of open apertures 26 at the aft surface. End flaps 28 are also provided to fold and retain the filter media within an interior cavity defined between the fore and aft surfaces. A number of other closed apertures 30 are let into the forward surface which are defined by partially slit or perforated scribe lines 34. Knockout covers 36 are thereby formed which can be removed as desired to expose the apertures 30 and permit air circulation.

The filter media 38 of the assembly of FIG. 1 comprises a relatively lightweight, spun fiber material. The fibers are spun from fiberglass, nylon or other polymers to produce a porous media. Such a media exhibits a back-filling characteristic. That is, debris collects on the aft surface and progressively accumulates forward as the airflow is obstructed by the collected debris. A bi-colored media is presently used which indicates useful life through changing colors in the color zones. The availability of the endflaps 28, however, permits use of other filter media with the cartridge framework 24.

Figure 4:
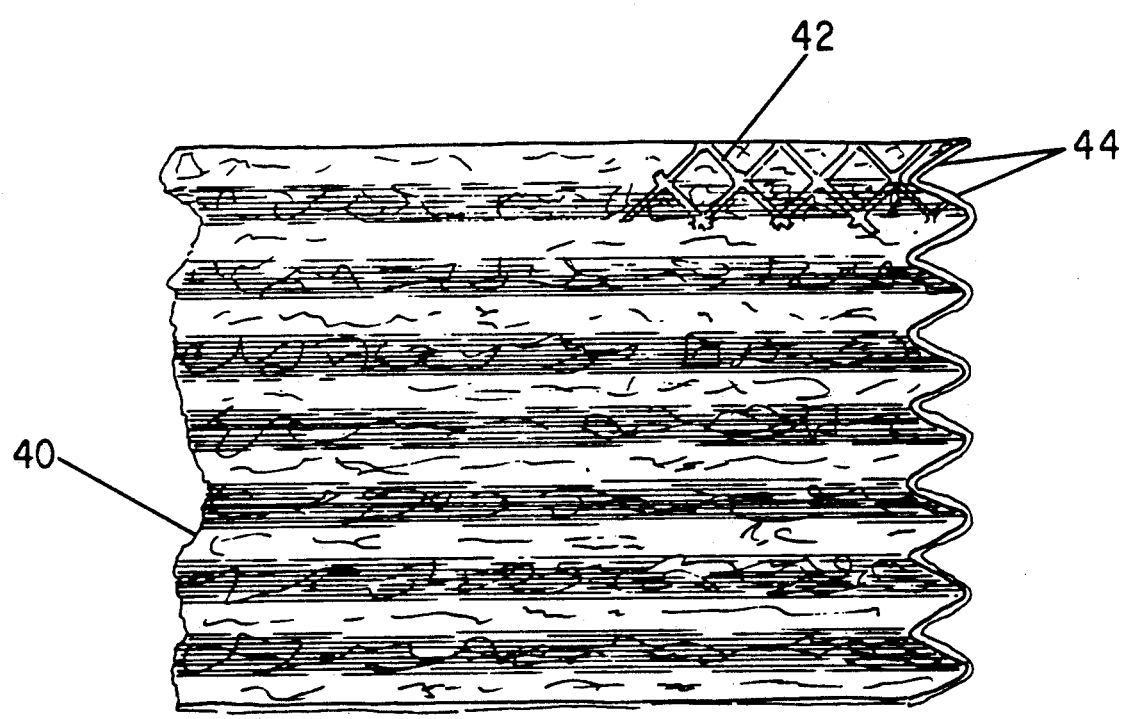
FIG. 4 is a plan drawing of an accordion like media which may be used with the present cartridges.
Figure 6:
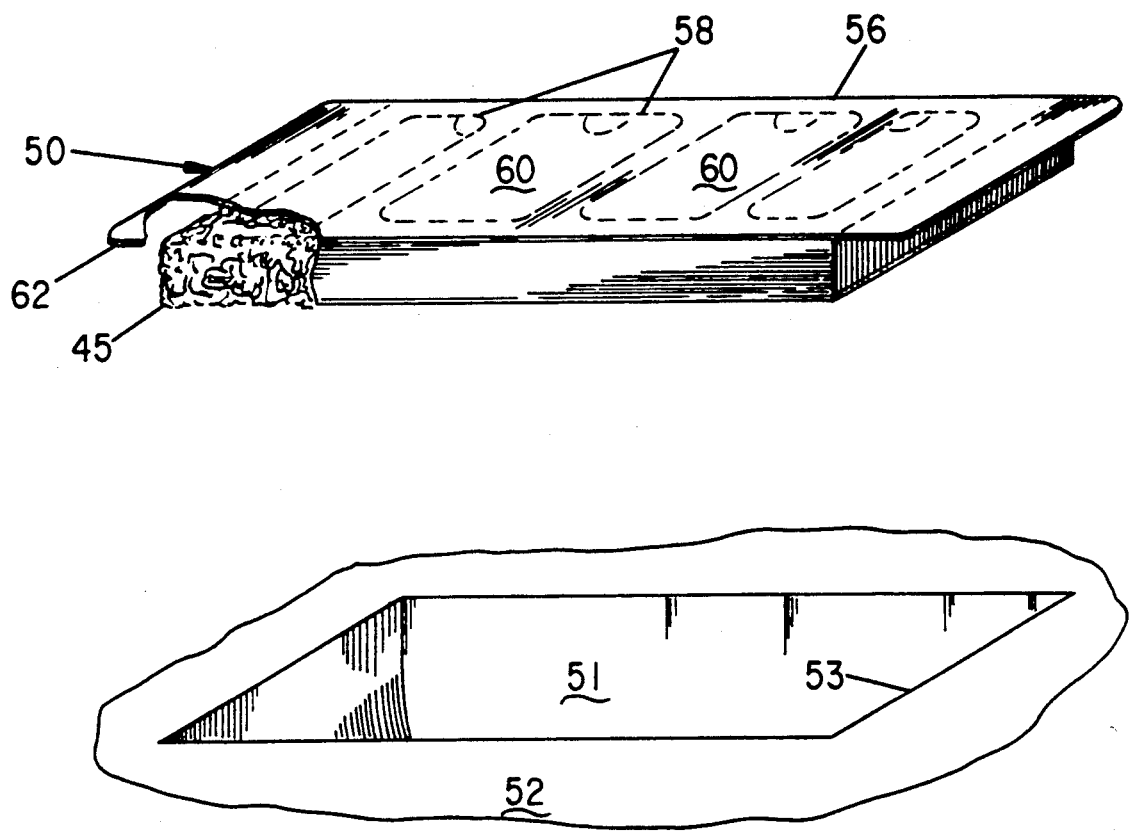
FIG. 6 is a perspective drawing of a floor or ceiling mount cartridge shown displaced from a typical floor or ceiling duct opening.

One such alternative media 40 is shown in FIG. 4. The media 40 comprises a web of porous material and to one surface of which a criss-cross gridwork 42 is bonded. The material is then folded to provide a plurality of V-shaped pleats 44. Another media 45 which can be used is shown in FIG. 6 and comprises a so called "hogs hair" media. That is, it comprises a plurality of relatively coarse and stiff filaments which are bonded into a pad-like media. This media finds advantage for collecting relatively large volumes of debris, without becoming totally obstructed to airflow.

Returning attention to FIG. 2, a plan drawing is shown of the front surface of the cartridge assembly 2. As mentioned, knockout covers 36 are scribed into the front surface which can be selectively removed. Also formed into the surface at the right and leftmost aperture regions 30 are a plurality of horizontal tabs 22 which are detachable along their vertical edges, and perforated to permit bending at their upper and lower horizontal edges. The tabs 22 are thus hinged to the framework 24 and project therefrom when folded. With the insertion of the cartridge assembly 2 into the port 4, the tabs 22 are stapled or fastened to the wall surface or the ductwork. The assembly is thus positively restrained to the ductwork port 4, until the fasteners are removed.

Depending upon whether the knockout covers 36 are removed, the cartridge 20 either serves as a plug or a filter.

Figure 5:
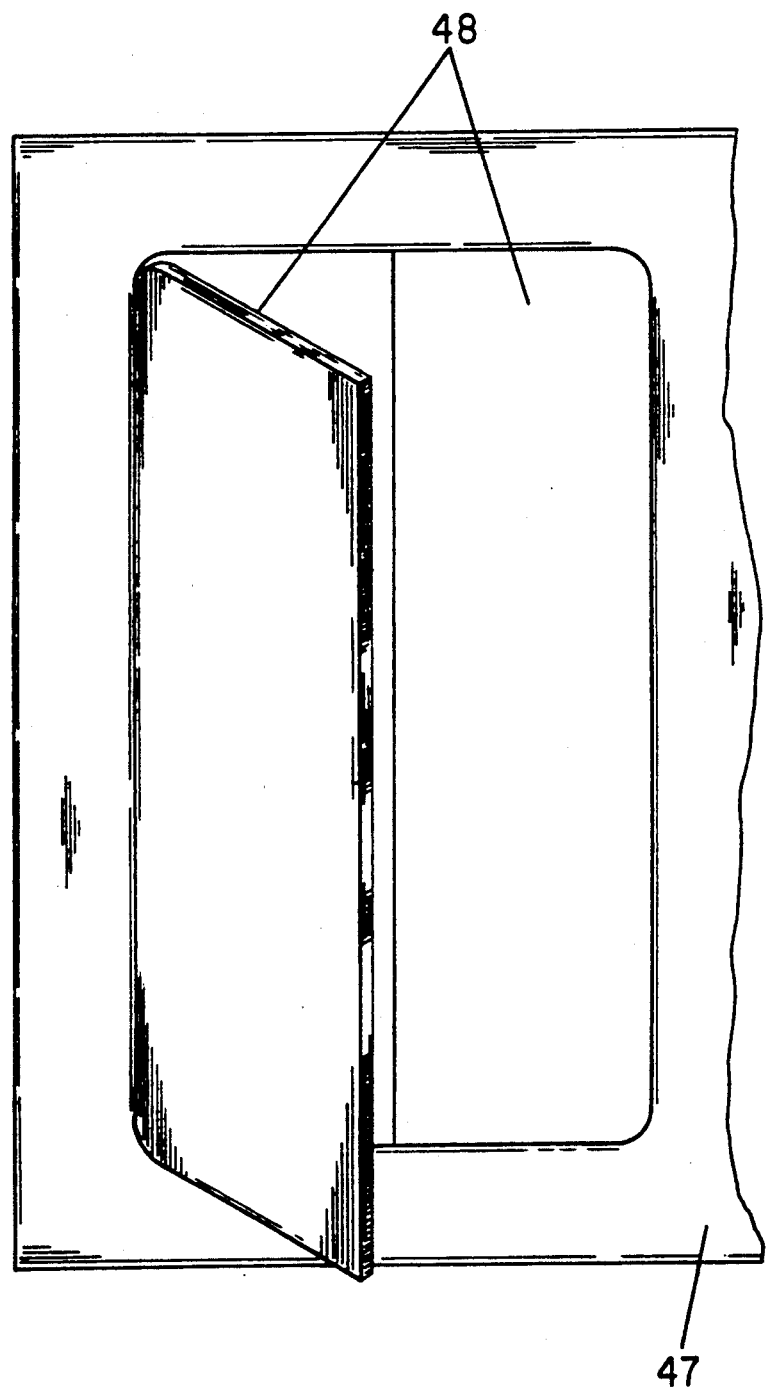
FIG. 5 is a drawing of an alternative configuration of the cartridge attachment tabs.

FIG. 5 shows an alternative configuration of one of the tab regions of an alternative framework 47 and wherein hinged vertical restraint tabs 48 are provided. Restraint tabs 49 may also be scribed into the sides or peripheral edges of the framework, reference FIG. 7.

FIG. 6 depicts an alternative cartridge assembly 50 which finds application for floor or ceiling duct ports. That is, the ductwork or boot ends 51 are fastened to the ceiling framing members or to the floor framing members or floor 52 adjacent the cutout opening 53. In construction settings, roughed-in floor duct openings are a particular culprit for collecting debris. Large volumes of debris is normally swept or thrown into such openings.

The cartridge assembly 54 which mounts in the opening 53 comprises a framework 56 which again includes a plurality of open apertures on the aft or inner surface (not shown) and a plurality of scribed apertures 58 having preformed knockouts 60. End tabs 62 extend from the ends of the framework 56 to permit retention within the duct 51. The filter media 45, as mentioned, preferably provides a coarse texture which is capable of containing large volumes of solid debris. Thus, a hogs-hair media is commonly used.

Figure 7:
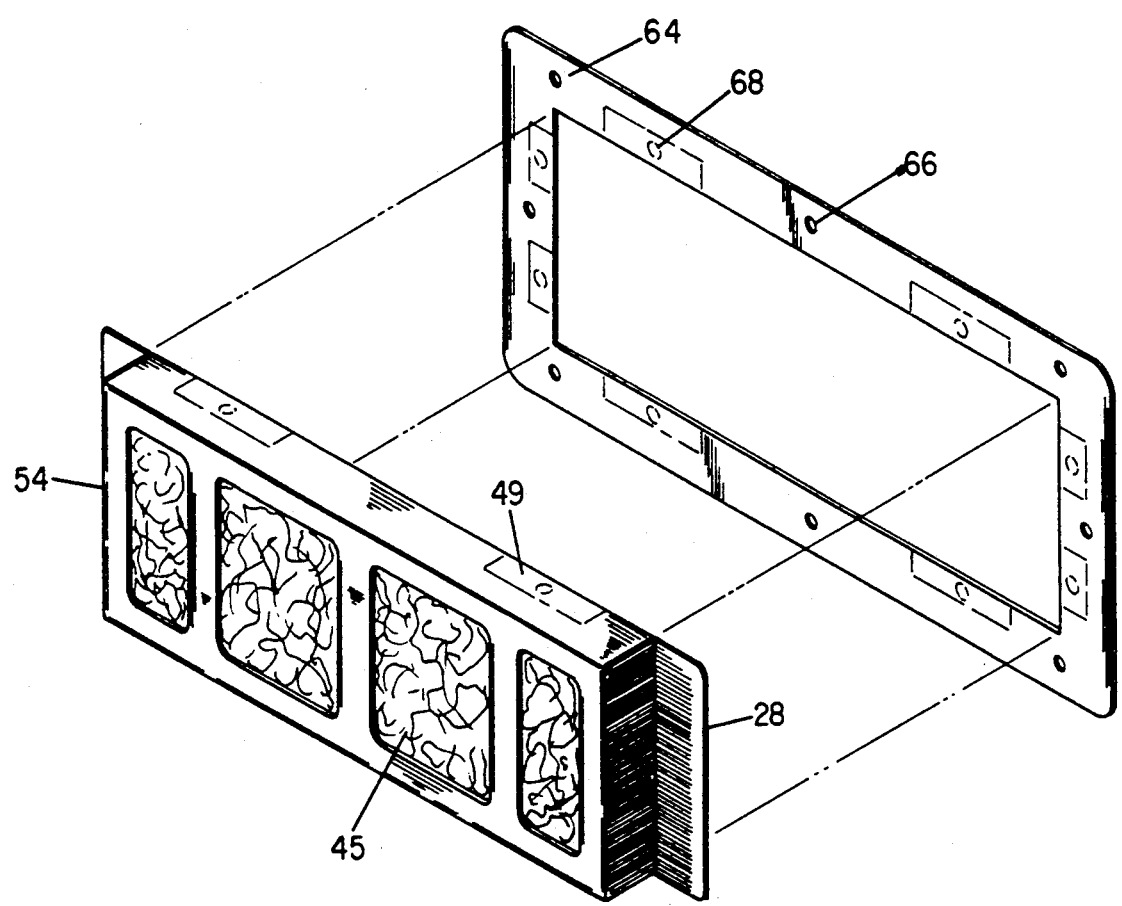
FIG. 7 is a perspective drawing of the cartridge of FIG. 6 including a separately attached border trim.

With attention to FIG. 7, another alternative construction is shown wherein a separate border trim plate 64 is shown detached from the cartridge 50. The trim plate 64 accommodates larger or odd size duct openings relative to the cartridge size. On such ocassions, the cartridge 50 is separately attached to the trimpiece 64. A plurality of apertures 66 and scribed tabs 68 are provided in the trimpiece 64. Staples may be used to secure the trimpiece 64 to the end flaps 62 or the framework 54. Otherwise, screw, nail or staple fasteners may be mounted through the apertures 66 and tabs 68 to secure the assembly 54 to the ceiling or floor.

Figure 8:
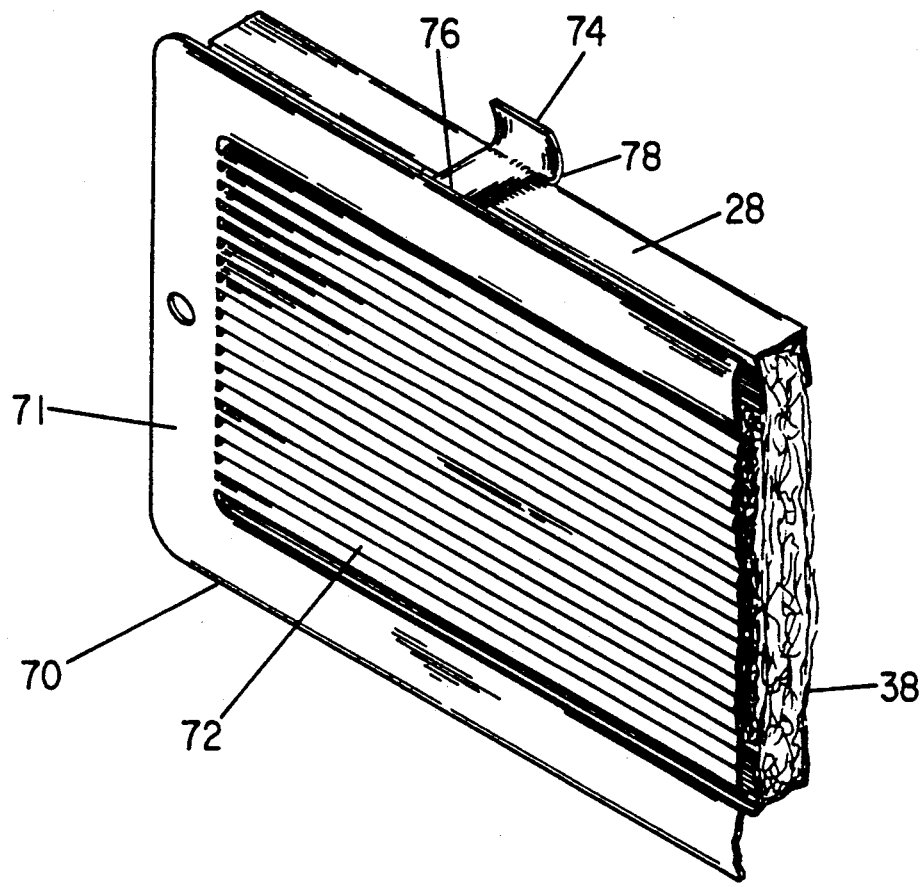
FIG. 8 is a perspective drawing of a molded trimpiece which includes a plurality of spring clips for securing the filter to the trimpiece and the trimpiece to the ductwork.

FIG. 8, lastly depicts a snap mounting permanent cover plate or trimpiece 70 which may be used in combination with the cartridge 20 or 50 to cover the ductwork ports 4 or 53, yet retain the cartridges 20 and 50 thereto. The trimpiece includes a border 71 which surrounds a central, baffled or louvered gridwork 72. Projecting from the rear surface of the plate 70 are a plurality of spring fingers or projections 74 which include first and second resilient portions 76, 78. The first portion 76 of each finger serves to restrain the cartridges 20 or 50 28 to the cover 70, and the second aft portion 78 mates with the ductwork ports 4 or 53 and slits or apertures (not shown) let into the ductwork to secure the cover and filter to the port. Such trimpieces 70 find particular advantage for continuing usage of the cartridges 20 or 50 by the homeowner, well after initial move-in.

While the invention has been described with respect to its presently preferred and variously considered alternative embodiments, modifications and improvements thereto, it is to be appreciated still other constructions may suggest themselves to those skilled in the art. Accordingly, it is contemplated the following claims should be interpreted to include all those equivalent embodiments within the spirit and scope thereof.

What is claimed is:

1. Apparatus for use in combination with air handling equipment having a central blower means coupled to a ductwork system including a plurality of inlet and outlet ports, comprising:
   a) filter means comprising a media porous to the passage of air therethrough, yet trapping airborne particulates; and
   b) a multi-walled framework defining a cavity between at least a fore and an aft wall, wherein said fore and aft walls include a plurality of apertures and wherein said framework includes; 1) means for removably mounting said filter means within said cavity, 2) means for restraining said framework to the ports of said ductwork system, and 3) means for selectively covering ones of said apertures to prevent airflow through said framework.

2. Apparatus as set forth in claim 1 including an ornamental trim cover, wherein said cover includes a central meshwork surrounded by a circumscribing border, means for restraining said framework to said cover and means for restraining said cover to said ductwork ports.

3. Apparatus as set forth in claim 2 wherein said cover includes a plurality of resilient projections, each projection having first and second portions wherein the first portion secures said framework to said cover and the second portion secures the cover to the ductwork port.

4. Apparatus as set forth in claim 1 wherein said framework is comprised of a sheet goods material which is formed to include a plurality of fold regions, at least one hinged end closure region, a first surface including a plurality of apertures and a second surface including a plurality of partially scribed knockout regions and a plurality of partially scribed tabs, said knockout regions being selectively removable to permit air through said framework and said tabs being selectively detachable to hingedly project from said surface.

5. Apparatus as set forth in claim 1 wherein said framework means includes tab means which project from the periphery of the framework for securing the framework to the ductwork ports.

6. Apparatus as set forth in claim 1 wherein said filter media comprises a web of fibrous material, wherein the fibers are woven to be sufficiently porous to permit airflow therethrough, wherein a gridwork means is secured to one surface of said media for permitting shape retention.

7. Apparatus as set forth in claim 6 wherein said media is folded to exhibit a plurality of V-folds.

8. Apparatus as set forth in claim 1 wherein said filter media comprises a plurality of coarse fibrous filaments which are randomly laminated to a predetermined thickness.

9. Apparatus as set forth in claim 1 including a border piece having an aperture which substantially aligns with the apertures of the framework and means for securing said border piece in alignment with the framework.

10. A replaceable filter element comprising:
    a) a filter media having a porosity sufficient to permit airflow therethrough;
    b) support means for containing said filter media comprising a multi-walled container formed from a sheet goods material to include a plurality of scribed horizontal fold lines and first and second scribed end flaps, whereby said sheet goods can be folded into a multi-walled container having an interior cavity defined between first and second re-closable end flaps thereto, wherein a first surface of said container includes a plurality of apertures, and wherein a second surface of said container includes a plurality of partially scribed regions, said partially scribed regions defining removable covers, whereby airflow is prevented while said covers are attached and airflow is permitted when said covers are removed, and wherein ones of the walls include a plurality of scribed mounting tabs, whereby said mounting tabs can be detached and bent to project from the housing to restrain the housing to one of said ductwork ports.

11. Apparatus as set forth in claim 10 including an ornamental trim cover, wherein said cover includes a central meshwork surrounded by a circumscribing border and a plurality of resilient projections, each projection having first and second portions wherein the first portion secures said framework to said cover and the second portion secures the cover to the ductwork port.

* * * * *